Dec. 1, 1936.   C. A. A. G. SABAEFF   2,062,830
SELF PROPELLING SCOOTER
Filed Sept. 6, 1935
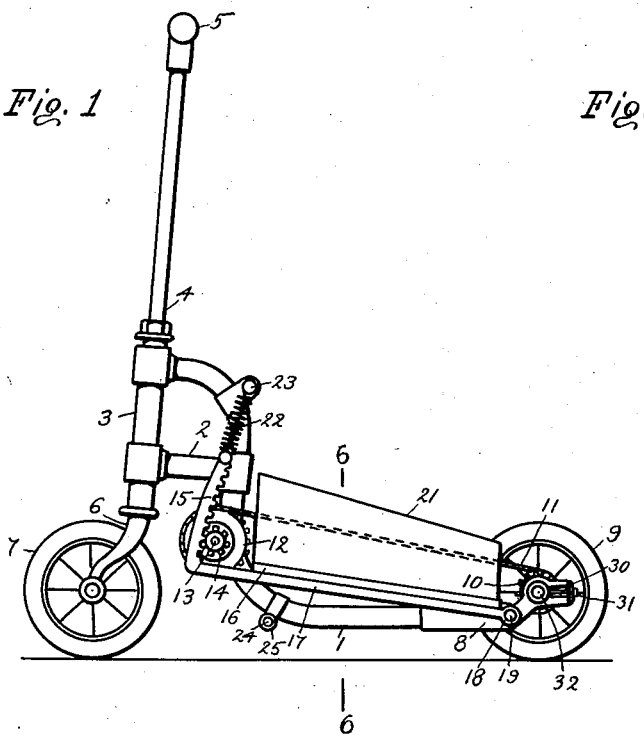
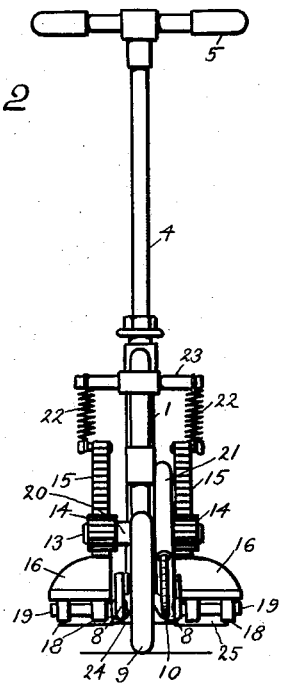
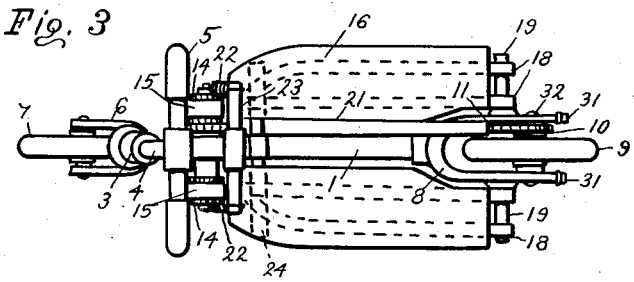
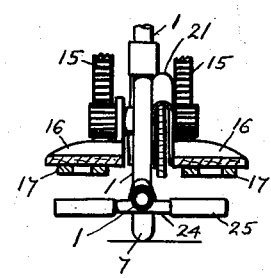
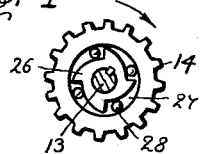
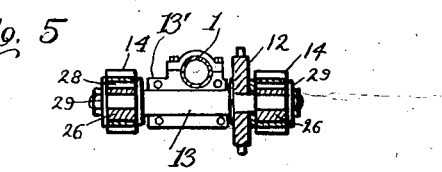
CLEMENT A.A.G. SABAEFF
INVENTOR
BY John P. Nikonov
ATTORNEY Patented Dec. 1, 1936

2,062,830

UNITED STATES PATENT OFFICE 2,062,830

SELF-PROPELLING SCOOTER

Clément A. A. G. Sabaeff, New York, N. Y.

Application September 6, 1935, Serial No. 39,401

6 Claims. (Cl. 208—37)

My invention relates to self propelling scooters and has particular reference to scooters having pedals for operating their wheels.

A scooter of an ordinary type represents a low two-wheeled vehicle with a steering handle and a low platform on which the rider stands with his feet. The propelling force, when not coasting, is furnished by pushing one or the other foot against the ground.

Scooters of this type, while providing a healthy and pleasant exercise, cannot be used for any extensive riding as the method of propulsion is very awkward and tiresome.

I have found, however, that it is possible to construct a scooter of the ordinary general shape but provided with a mechanical drive for the rear wheel, the drive being operated by the rider's weight, alternately shifting it from one foot to the other, but without otherwise changing their positions or removing them from the supporting pedals.

For this purpose I provide my scooter with a chain drive (or other suitable mechanical drive) to the rear wheel from a shaft mounted on the front portion of the scooter frame. I provide this shaft with pinions on either side of the frame, each pinion having a free-wheeling or overrunning clutch inside. The pinions are engaged by curved racks attached to the front ends of long pedals suspended on springs in their front portions. The rider, standing on these pedals and alternately shifting his weight from one foot to the other, will cause the racks to reciprocate thereby alternately turning the pinions and rotating the rear wheel. The steering handle provides as in ordinary scooters a means to brace or support the rider in his position.

My invention is more fully described in the accompanying specification and drawing in which—

Fig. 1 is an elevation of my scooter, Fig. 2 is a rear view of the same, Fig. 3 is a top plane view, Fig. 4 is a detail view of a pinion with an overrunning clutch, Fig. 5 is a detail view of a driving shaft with pinions, and Fig. 6 is a sectional view taken on the line 6—6 of Fig. 1.

My scooter consists of a curved tube 1 forming a frame and having an extension 2 for supporting a front tubular portion 3 in which a steering rod 4 is mounted. The rod 4 has a steering handle 5 on top and a fork 6 at the lower end for a front wheel 7. The rear end of the tube 1 has a fork 8 for a rear wheel 9, the latter being provided with a sprocket 10 for a chain 11. This chain is engaged by a driving sprocket 12 mounted on a driving shaft 13 journaled in a bearing 13' attached to the front portion of the frame 1. Pinions 14 are mounted on the ends of the shaft 13 and are in mesh with curved racks 15 attached by their lower ends to the front ends of pedals 16. These pedals are formed of metal frames 17 having hinges 18 in the rear for shafts 19 attached by their inner ends to the sides of the rear fork 8. Wooden, or of other suitable material, boards 16 are fastened to the upper sides of the pedal frames 17. A shield 21 for the chain 11 is supported on the inner edge of the corresponding pedal. The upper ends of the racks 15 are suspended on the ends of tension springs 22. The upper ends of the springs are attached to the ends of a cross bar 23 mounted on the upper portion of the frame 1.

A transverse bar 24 is supported on the lower portion of the frame 1 forming a rest for the pedals in their lower position. Rubber sleeves 25 are placed on the bar in order to soften the impact with the pedals.

The pinions 14 are mounted on overrunning clutches, rotating freely on hubs 26 keyed on the shaft 13 and provided with tapering grooves or recesses 27 for balls or rollers 28. Washers 29 retain the sides of the pinions. The pinions engage the shaft 13 only when they are turned in direction of the arrow in Fig. 4, as then the rollers become wedged in the recesses against the inner side of the pinion bore. When turned in the opposite direction, the pinion entrain the rollers into the deeper portions of the recesses where they do not have any wedging action. Likewise, if the pinions are stationary and the scooter moves forward, the balls are moved into the deeper portions of the recesses and release the pinions.

I do not wish to limit myself to any particular construction of the free-wheeling or overrunning clutch, as any suitable type of such clutches can be employed in my mechanism.

The ends of the rear fork 8 are provided with slots 30 for bolts 31 engaging the shaft 32 of the rear wheel so that it can be adjusted horizontally for tightening the chain 11.

The rider, when using my scooter, stands with his feet on the pedals 16 and holds the steering handle 5. By alternately shifting his (or her) weight from one foot to the other, the pedals and their racks are made to move up and down, turning the pinions. The springs 22 retrieve the racks to their upper position when the weight is transferred to the other foot.

In this respect the use of my scooter differs but little from the ordinary scooters, except that by shifting his weight from one foot to the other, the rider at the same time propels the scooter.

My scooter, while providing a pleasant and interesting toy for children, also furnishes an effective means for exercising the muscles of the legs and hips, up to the waist line, being similar in this effect to mountain climbing.

It is understood that my invention in its practical embodiments may be modified in various ways without departing from the spirit of my invention as set forth in the appended claims.

I claim as my invention:

1. In a self propelling scooter, the combination of a frame, a steering post with a wheel rotatively mounted in the front portion of said frame, a shaft transversely supported on the rear end of said frame, a rear wheel rotatively mounted on said shaft, a bearing transversely supported on the front portion of said frame, a driving shaft journaled in said bearing, driving connections between said driving shaft and said rear wheel, pinions on the ends of said driving shaft, free-wheeling clutches interposed between said pinions and said driving shaft, pedals on either side of said frame pivotally supported by their rear ends on the rear end of said frame, curved arcuate racks supported on the front ends of said pedals, the curvature of said racks being concentric with the pivots of said pedals, said racks being in mesh with said pinions, and means to raise one pedal while the other is being depressed.

2. In a self propelling scooter, the combination of a frame, a steering post with a wheel rotatively mounted in the front portion of said frame, a rear wheel rotatively supported in the rear portion of said frame, a driving shaft rotatively supported in the upper front portion of said frame, driving connection between said shaft and said rear wheel, pinions on the ends of said shaft, free-wheeling clutches in said pinions, pedals on either side of said frame pivotally supported by their rear ends on the rear end of said frame, racks on the front ends of said pedals in mesh with said pinions, springs tending to raise said racks with said pedals, and means to limit the vertical movements of said pedals.

3. In a scooter, the combination of a frame, a steering post with a front wheel rotatively supported in the front portion of said frame, a rear wheel rotatively supported in the rear portion of said frame, a driving shaft rotatively supported in the front portion of said frame in a transverse direction thereto, a sprocket on said shaft, a sprocket on said rear wheel, an endless chain connecting said sprockets, pinions on the ends of said driving shaft, free-wheeling clutches in said pinions, pedals on either side of said frame pivotally supported by their rear ends on the rear portion of said frame, racks on the front ends of said pedals in mesh with said pinions, means to raise one pedal while the other is being depressed, and a bar transversely supported on the lower portion of said frame and forming a rest for limiting the downward motion of said pedals, said free-wheeling clutches being adapted to transmit the rotation to said driving sprocket from said pinions in one direction only.

4. In a scooter of the type described, a driving mechanism having in combination a driving shaft rotatively supported in the front portion of the frame of said scooter, said shaft being placed in a transverse direction to said frame, a sprocket on said shaft, a sprocket on the rear wheel of said scooter, an endless chain connecting said sprockets, pinions on the ends of said shaft, free-wheeling clutches in said pinions, pedals on either side of said frame pivotally mounted on the rear portion of said frame, racks on the front ends of said pedals in mesh with said pinions, springs tending to raise said pedals with said racks, and a protecting cover for said chain, said clutches being adapted to transmit the rotation from said pinions to said driving sprocket in one direction only.

5. In a scooter, the combination of a frame, a steering post rotatively supported in the front portion of said frame, a front wheel rotatively supported in the lower portion of said post, a fork forming a rear end of said frame, a rear wheel rotatively supported in said fork, a driving shaft rotatively supported in the front portion of said frame in a direction transverse to said frame, a driving connection between said shaft and said rear wheel, pinions on the ends of said shaft, free-wheeling clutches in said pinions adapted to transmit rotation from said pinions to said shaft in one direction only, shafts extending from the sides of said fork in a direction transverse to said frame, pedals on either side of said frame, the rear ends of said pedals being rotatively supported on said rear shafts, arcuate racks on the front ends of said pedals, said racks being concentric with said rear shafts, means to limit the downward movement of said pedals, and a yieldable means for raising said pedals.

6. In a scooter, the combination of a frame, a steering post in the front portion of the frame, a front wheel supported on the post, a fork at the rear of the frame, a rear wheel rotatively supported in the fork, a driving shaft supported in the front portion of the frame in a transverse direction to its plane, a driving connection between the shaft and the rear wheel, rotary members on the shaft at the sides of the frame, free-wheeling clutches in said members, shafts extending from the sides of the frame, pedals on either side of the frame rotatively supported on the shafts, operative connections between the pedals and the rotary members, means to limit the downward movement of the pedals, and a yieldable means for raising the pedals, the pedals and the free-wheeling clutches being adapted to transmit rotation to the shaft when said pedals are moved downward.

CLÉMENT A. A. G. SABAEFF.